(12) United States Patent
Tanzilli et al.

(10) Patent No.: US 9,800,399 B2
(45) Date of Patent: Oct. 24, 2017

(54) METHOD AND DEVICE FOR SYNCHRONIZING ENTANGLEMENT SOURCES FOR A QUANTUM COMMUNICATION NETWORK

(71) Applicants: Centre National de la Recherche Scientifique—CNRS, Paris (FR); Université de Nice Sophia Antipolis, Nice (FR)

(72) Inventors: Sébastien Tanzilli, Nice (FR); Virginia D'Auria, Nice (FR); Olivier Alibart, Nice (FR); Anthony Christophe Mickaël Martin, Nice (FR); Laurent Labonte, St Laurent du Var (FR)

(73) Assignees: Centre National de la Recherche Scientifique—CNRS, Paris (FR); Université de Nice Sophia Antipolis, Nice (FR)

( * ) Notice: Subject to any disclaimer, the term of this patent is extended or adjusted under 35 U.S.C. 154(b) by 387 days.

(21) Appl. No.: 14/347,739

(22) PCT Filed: Sep. 28, 2012

(86) PCT No.: PCT/EP2012/069281
§ 371 (c)(1),
(2) Date: Mar. 27, 2014

(87) PCT Pub. No.: WO2013/045674
PCT Pub. Date: Apr. 4, 2013

(65) Prior Publication Data
US 2014/0355998 A1    Dec. 4, 2014

(30) Foreign Application Priority Data
Sep. 30, 2011  (FR) ...................... 11 58857

(51) Int. Cl.
*H04B 10/12*    (2006.01)
*H04L 7/00*    (2006.01)
(Continued)

(52) U.S. Cl.
CPC .......... *H04L 7/0075* (2013.01); *H04B 10/25* (2013.01); *H04B 10/70* (2013.01); *H04L 9/0852* (2013.01)

(58) Field of Classification Search
CPC ........ H04B 10/70; H04B 10/25; H04L 9/0852
See application file for complete search history.

(56) References Cited

U.S. PATENT DOCUMENTS 6,897,434 B1 *  5/2005  Kumar ................... B82Y 10/00
                                                    250/227.11
7,928,356 B2 *  4/2011  Gilbert .................... G01S 7/484
                                                    250/225
(Continued)

FOREIGN PATENT DOCUMENTS

GB        2471470 A      1/2011

OTHER PUBLICATIONS

Olivier et al; Tools for quantum repeaters: quantum teleportation, independent sources of entangled photons and entanglement purifaction; 2010; pp. 1-94.*

(Continued)

*Primary Examiner* — Ken N Vanderpuye
*Assistant Examiner* — Amritbir Sandhu
(74) *Attorney, Agent, or Firm* — Osha Liang LLP

(57) ABSTRACT

A device and a method for synchronizing entanglement sources with optical pump in a quantum communication network are disclosed. The device includes a pulsed optical source allowing emission of telecom wavelength optical clock pulses distributed in parallel to the entanglement sources to ensure synchronization of the entanglement (Continued)

sources; and for each of the entanglement sources, a frequency conversion device, allowing frequency conversion of the distributed telecom wavelength optical clock pulses to a wavelength adapted to optically pump the entanglement source. The method includes emitting and distributing in parallel, to the entanglement sources, telecom wavelength optical clock pulses; and locally, at each of the entanglement sources, frequency converting the telecom wavelength optical clock pulses to a wavelength adapted to optically pump the entanglement source.

12 Claims, 4 Drawing Sheets

(51) Int. Cl.
 *H04L 9/08* (2006.01)
 *H04B 10/25* (2013.01)
 *H04B 10/70* (2013.01)

(56) References Cited

U.S. PATENT DOCUMENTS

| | | | | |
|---|---|---|---|---|
| 8,270,841 | B2* | 9/2012 | Nishioka | H04B 10/70 380/255 |
| 9,294,191 | B2* | 3/2016 | Peters | H04B 10/70 |
| 2005/0094818 | A1* | 5/2005 | Inoue | H04L 9/0858 380/278 |
| 2005/0111665 | A1* | 5/2005 | Ichimura | H04L 9/0855 380/256 |
| 2008/0232816 | A1* | 9/2008 | Hoshida | H04J 14/06 398/152 |
| 2009/0028340 | A1* | 1/2009 | Trifonov | G02F 1/39 380/278 |
| 2009/0135870 | A1* | 5/2009 | Hayat | B82Y 20/00 372/44.01 |
| 2009/0180616 | A1* | 7/2009 | Brodsky | H04B 10/70 380/256 |
| 2009/0268276 | A1* | 10/2009 | Lee | H04B 10/70 359/330 |
| 2009/0317089 | A1 | 12/2009 | Peters et al. | |
| 2010/0252745 | A1* | 10/2010 | Hunt | G01S 7/4861 250/372 |
| 2012/0051755 | A1* | 3/2012 | Arahira | H04L 9/0855 398/158 |
| 2012/0076503 | A1* | 3/2012 | Habif | G01C 3/08 398/140 |
| 2014/0363174 | A1* | 12/2014 | Azuma | H04L 9/0855 398/173 |
| 2015/0003824 | A1* | 1/2015 | Bovino | H04L 9/0852 398/25 |
| 2015/0055961 | A1* | 2/2015 | Meyers | B82Y 10/00 398/140 |
| 2015/0372768 | A1* | 12/2015 | Dynes | H04B 10/70 398/188 |
| 2016/0047643 | A1* | 2/2016 | Yuan | H04B 10/70 398/25 |
| 2016/0164615 | A1* | 6/2016 | Dailey | H04B 10/70 398/149 |
| 2017/0126324 | A1* | 5/2017 | Yu | H04B 10/5161 |
| 2017/0155499 | A1* | 6/2017 | Han | H04L 7/0075 |
| 2017/0180111 | A1* | 6/2017 | Lanzone | H04L 7/0075 |

OTHER PUBLICATIONS

Riedmatten et al; long distance entanglement swapping with photons from separated sources; Sep. 2004; pp. 1-5.*

Yang et al; Experimental synchronization of Independnet Entangled photon sources; Mar. 2006, Physical Review Letters; pp. 1-4.*

Rainer et al; High-fidelity entanglement swapping with fully independnet sources; 2009; The Americal Physical Society; pp. 1-4.*

Yuan et al; Synchronized Independent Narrow-Band Single Photons and Efficient Generation of Photonic Entanglement; May 2007, The Americal Physical Society; pp. 1-4.*

International Search Report issued in PCT/EP2012/069281 dated Nov. 21, 2012 (3 pages).

Written Opinion of the International Searching Authority issued in PCT/EP2012/069281 dated Nov. 21, 2012 (7 pages).

International Preliminary Report on Patentability from PCT/EP2012/069281 dated Aug. 26, 2013 (6 pages).

Landry; "Tools for quantum repeaters: quantum teleportation, independent sources of entangled photons and entanglement purification", Universite De Geneve; XP055025517; Jan. 1, 2010 (Jan. 1, 2010), (140 pages).

Ma et al.; "1310 nm differential-phase-shift QKD system using superconducting single-photon detectors"; New Journal of Physics, vol. 11, No. 4, Apr. 2009 (Apr. 2009), XP020154507 (9 pages).

* cited by examiner

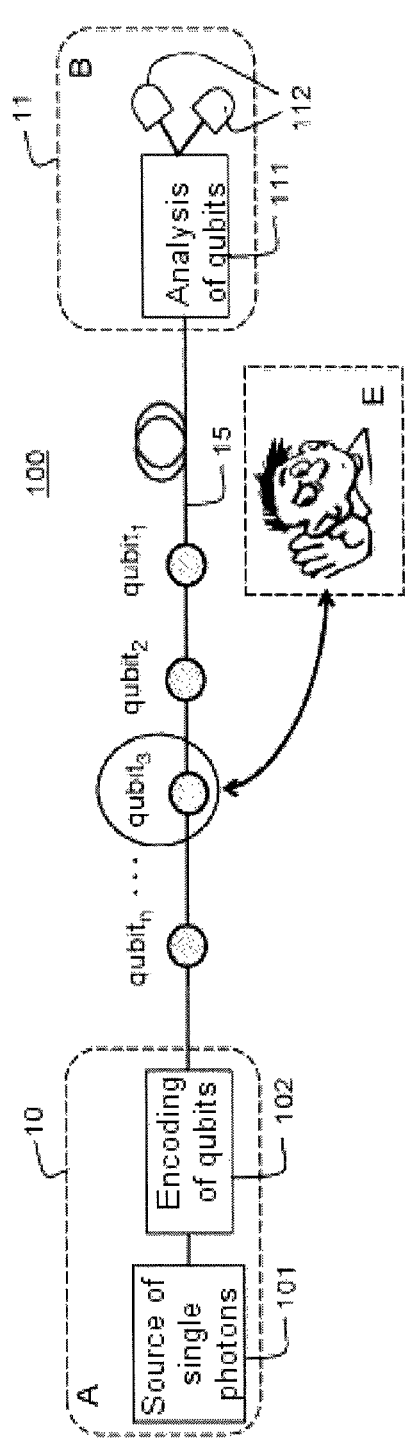
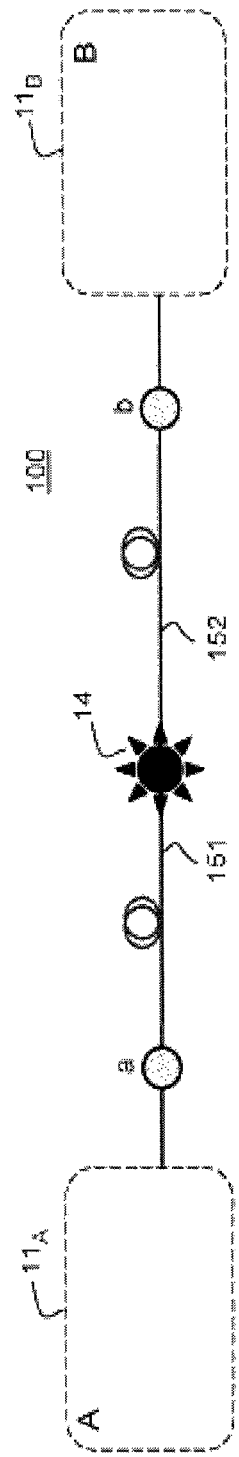
FIG.1A
FIG.1B

METHOD AND DEVICE FOR SYNCHRONIZING ENTANGLEMENT SOURCES FOR A QUANTUM COMMUNICATION NETWORK

PRIOR ART

Technical Field of the Invention

The present invention relates to a method and a device for synchronizing entanglement sources for quantum communication network, in particular for long distance quantum communication networks.

Prior Art

The objective of quantum communications is to transmit quantum states (or "qubits" according to the abbreviation standing for the expression "quantum bits") from one place to another. FIG. 1A thus illustrates a simple quantum communication network 100 between a first place A and a second place B allowing two distant interlocutors, traditionally named "Alice" and "Bob", to establish a secret key with very high confidentiality. In this example, situated at the place A is an emitter 10 comprising a source 101 of single photons (for example a source of atoms with two levels or a quantum dot or a source of heralded single photons, based on nonlinear optics) and an encoding device 102 making it possible to code each bit of the key to be transmitted by a photon whose quantum state (qubit) is determined in a random manner. The quantum state is the state coded on a property of the photon, called a "quantum observable", this property being for example the polarization, the wavelength or the emission time (otherwise called "time-bin"). The photons are transmitted for example by means of an optical fiber 15. Situated at the place B is a receiver 11 comprising a device for analyzing qubits 111 and two detectors 112, for example detectors of single photons, allowing the analysis of the quantum state according to two measurement bases. Various known protocols for distributing keys implemented for the encoding and the analysis of qubits allow the two partners to know with certainty whether the key or a part of the key has been intercepted by a spy E (traditionally called "Eve").

Within the framework of quantum communications over long distances, photons at so-called "telecom" wavelengths have naturally come to the forefront as ideal support for quantum information because of their very weak interaction with the environment and of the low losses on propagation in standard optical fibers. Telecom wavelengths are defined by the International Telecommunications Union (ITU) in the form of standardized frequency bands (for example O, E, S, C, L, U). However, although very low, the transmission losses set a limit beyond which communication is no longer possible since the rate of detected photons becomes lower than the noise rate in the detector which remains the main limitation of the signal-to-noise ratio. A great deal of research work has however pushed these secure links to distances of as much as a few hundred kilometers, at the price however of considerable effort in the optimization of the hardware used and of a very low final rate of establishment of secret keys. Indeed, the regeneration of the optical signal by means of standard telecoms amplifiers (repeaters) is not possible in quantum communication on account of the so-called "non-cloning" theorem since it would disturb the signal in the same manner as would a spy in seeking to intercept the signal.

FIG. 1B proposes a quantum communication network between A and B in which the communication distance can be doubled. Accordingly, a source for emitting entangled photons 14, or entanglement source, emits pairs of photons correlated on one of their quantum observables. Stated otherwise, the quantum state of each of the photons taken individually cannot be defined. Such a source of pairs of entangled photons is for example based on nonlinear optics and comprises the conversion in a nonlinear crystal of a photon issuing from a pump beam into a pair of photons, this conversion occurring with a certain probability. At each of the places A and B is situated a receiver 11, each receiver comprising similar elements (not represented) to the receiver 11 of FIG. 1A. The entangled photons propagating on either side of the source 14 to the places A and B on optical fiber segments referenced 151, 152 respectively, it is understood that with respect to the network of FIG. 1A, it is possible to almost double the communication distance between A and B if the same technical resources (in particular, fibers and detectors) are used. However, the same limitation relating to transmission losses applies on each of the segments, and it will not be possible to obtain network lengths of greater than double those obtained in a scheme of the type of that of FIG. 1A.

The quantum communication networks based on concepts of "quantum relays" can make it possible to cover larger distances. In such a network, pairs of entangled photons, that is to say tied by one of their quantum observables, propagate over short sections and are combined in cascade so as to cover a more considerable distance (see for example D. Collins et al., "Quantum relays for long distance quantum relay cryptography", Jour. Mod. Opt. 52, 735 (2005)). One then speaks of "entanglement teleportation". FIG. 1C thus illustrates a quantum communication network between A and B with two spatially separated sources of entangled photons 141 and 142 and a relay station 13 situated between the two sources, in which station a projective measurement operation is carried out, called BSM according to the abbreviation standing for the expression "Bell State Measurement". The entanglement source 141 emits pairs of entangled photons a and c which propagate over optical fiber segments 153, 154 respectively to a receiver $11_A$ at A and to the relay station 13. The entanglement source 142 emits pairs of entangled photons b and c' which propagate over optical fiber segments 155, 156 respectively to a receiver $11_B$ at B and to the relay station 13. The receivers comprise as previously a device for analyzing qubits and a pair of single-photon detectors. The relay station allows the projection measurement on a state called the Bell state of the photons c and c' emitted respectively by the two independent sources 141 and 142, the projection measurement being based on the two-photon interference of the photons c and c' originating from each of the two entanglement sources. The interference measurement triggers a signal at each of the receivers situated at A and B allowing measurement of the qubits a and b, respectively. It is however necessary to synchronize the set of sources of entangled photons with a time that is less than the coherence time of the photons c and c', i.e. generally a time of less than a picosecond, or indeed even less than a few tens of femtoseconds depending on the employed sources, so as to ensure the temporal overlap of the photons emitted by the independent sources at the relay station or stations. The experimental realizations of a long distance network of the type of FIG. 1C are thus affected by the technological limitations due mainly to the necessity for synchronization of the entanglement sources situated at large distances.

In particular, the electronic or optoelectronic synchronization of the entanglement sources brings about an increase in the timing jitter which can only be compensated by increasing the coherence time of the entangled photons by means of a spectral filtering of the photons, thereby engendering a decrease in the qubits communication frequency. For example, it has been shown (see R. Kaltenbaek et al, "High-fidelity entanglement swapping with fully independent sources", Phys. Rev. A, 79, 040302 (2009)) that with optoelectronic synchronization of the entanglement sources, it is not possible to distance the entanglement sources more than 30 kms apart, and the frequency of emission of the pairs of entangled photons remains limited with this technique to 100 MHz.

A hybrid approach of optoelectronic synchronization has been proposed alluding to the feasibility of a communication at 2 GHz (see the doctoral thesis of O. Landry "Tools for quantum repeaters: quantum teleportation, independent sources of entangled photons and entanglement purification", Univ. of Geneva, 2010, no Sc. 4163 and O. Landry et al., "Simple synchronisation of independent picosecond photon sources for quantum communication experiments", arXiv: 1001, 3389 (2010))). More precisely, in chapter 6 of O. Landry's doctoral thesis are described independent entanglement sources for a quantum communication network and the synchronization of these sources. The synchronization is based on the emission of optical pulses by a master laser ("Mode locked laser") making it possible on the one hand to pump one of the entanglement sources and on the other hand to trigger a slave laser, itself used to pump a second entanglement source. However, here again, the external triggering of the slave laser by the master laser brings about timing jitter effects, related to opto-electrical and electro-optical conversions, thereby limiting the precision of the synchronization and consequently, the maximum distance apart that the entanglement sources can be situated.

Patent application US 2009/0317089 describes a quantum communication network architecture comprising relay stations linked in cascade so as to increase the communication distance. The architecture is based on the use of a single pump laser source for the creation in a first station of a first pair of entangled photons, and then, at a given distance, the creation in a second station of a second pair of entangled photons by means of a part of the pump beam tapped off and transmitted to the second station, the creation of the second pair of entangled photons being conditioned on the detection of one of the photons of the first pair. This sequential manner of operation assumes, however, the coupling in each of the segments of the part of the pump beam tapped off at the previous station with one of the entangled photons of the pair of entangled photons created at the previous station, rendering implementation technically tricky. Moreover, the propagation between two stations of the pump beam of necessarily shorter wavelength than that of the entangled photons limits the distance between the stations on account of the transmission losses. It is also noted that the technology described involves the detection of an entangled photon in the actual station where it was generated, thereby limiting the range of the communication.

An object of the invention is to propose a wholly optical method and device for the synchronization of entanglement sources allowing quantum communication over a network based on high-bitrate quantum relays and over very large distances, without the limitations of the prior art.

SUMMARY OF THE INVENTION

According to a first aspect, the invention relates to a device for synchronizing entanglement sources with optical pump in a quantum communication network, comprising a pulsed optical source allowing the emission of telecom wavelength optical pulses distributed in parallel to the set of entanglement sources so as to ensure an optical clock common to said entanglement sources and comprising, for each entanglement source, a frequency conversion device for the distributed optical pulse, allowing the generation of a optical pulse at a wavelength adapted to optically pump the entanglement source for the generation of pairs of entangled photons.

This novel concept of fully optical synchronization, which implements a single pulsed source making it possible to deliver an optical clock common to the various entanglement sources of a network, makes it possible to circumvent the additional temporal jitter inherent to optoelectronic devices, and enables the establishment of high-bitrate quantum communication networks over long distances. This novel form of synchronization can be applied whatever the protocol implemented in the quantum communication network, with any number of entanglement sources and users, in pairwise communication between the users.

According to a variant, said pulsed optical source is a laser emitting pulses at 1550 nm. This wavelength, much used in telecoms, allows the use of low-cost standard telecoms components (components and optical fibers).

According to a variant, the synchronization device furthermore comprises, for each entanglement source, a clock regeneration device. The clock regeneration device can comprise for example a dispersion-compensation module, making it possible to compensate the dispersion due to the propagation of the clock pulse from the pulsed source to the entanglement source and/or an optical amplifier to recover the mean optical power.

According to a variant, the frequency conversion device for the distributed optical pulse is a frequency doubling or frequency summation module. The wavelength adapted to optically pump the entanglement source is generally within the visible but by virtue of the novel synchronization concept, the conversion into the visible if it is necessary is carried out locally at the level of the entanglement source, limiting the clock pulse propagation losses in the optical fibers.

Advantageously, the convention device is a frequency doubler, for example a waveguide of periodically polarized lithium niobate, available commercially.

According to a variant, said pulsed light source is a laser emitting picosecond pulses whose reshaping is well mastered. Moreover, these sources offer high repetition rates.

According to a variant adapted to quantum communication networks using the emission time as quantum observable for encoding the photons, the synchronization device furthermore comprises a device for preparing the quantum observable using a Mach-Zehnder interferometer. The Mach-Zehnder interferometer allows the distribution of pulse doublets at the entanglement sources. This simplifies the encoding of the qubits at the level of the entanglement sources since a single preparation module is necessary at the level of the pulsed laser source, and no longer at the level of each entanglement source.

According to a second aspect, the invention relates to a quantum communication network between at least one first and one second user comprising, for each user pair, a plurality of entanglement sources disposed in cascade between said users and between two entanglement sources, a relay station allowing entanglement teleportation between the users, and furthermore comprising a device for synchronizing the set of said entanglement sources according to the first aspect.

According to a variant, the entanglement sources comprise a nonlinear optics device for the generation of pairs of entangled photons. For example, this may entail 4-wave mixing or spontaneous parametric conversion. In one or the other of these examples, devices for the implementation of these effects are commercially available.

According to a variant, the quantum observable of the photon is the emission time.

According to a third aspect, the invention relates to a method for synchronizing entanglement sources with optical pump in a quantum communication network comprising the emission and the distribution in parallel to the set of entanglement sources of telecom wavelength optical pulses and comprising locally, at the level of each of the entanglement sources, the frequency conversion of the clock pulse in a wavelength adapted to optically pump said source.

Advantageously, the method according to the third aspect furthermore comprises at the level of each of the entanglement sources, the regeneration of the clock pulse.

BRIEF DESCRIPTION OF THE DRAWINGS

Other advantages and characteristics of the invention will become apparent on reading the description, illustrated by the following figures. In the figures, identical elements are tagged by the same references.

FIGS. 1A to 1C (already described), diagrams illustrating quantum communication networks between two users, according to the prior art;

DETAILED DESCRIPTION

Figure 1C:
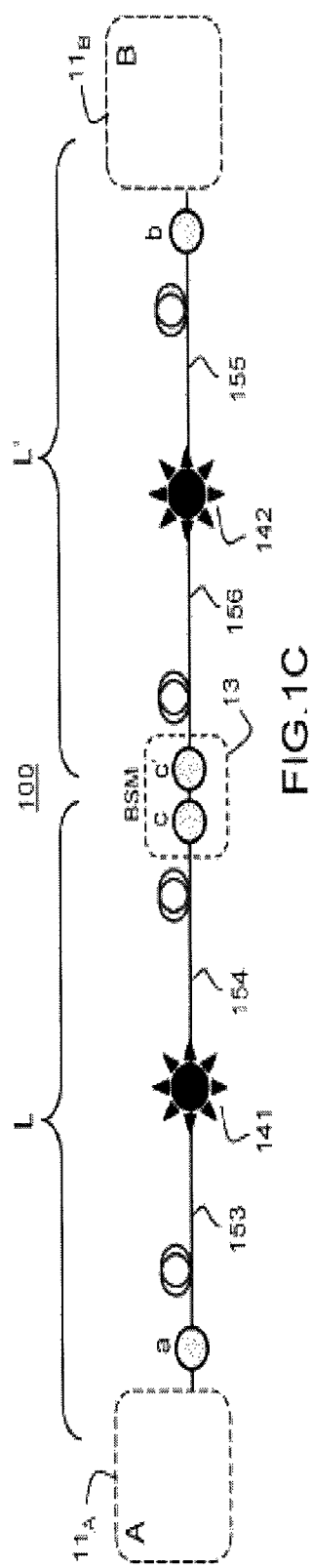
Figure 2:
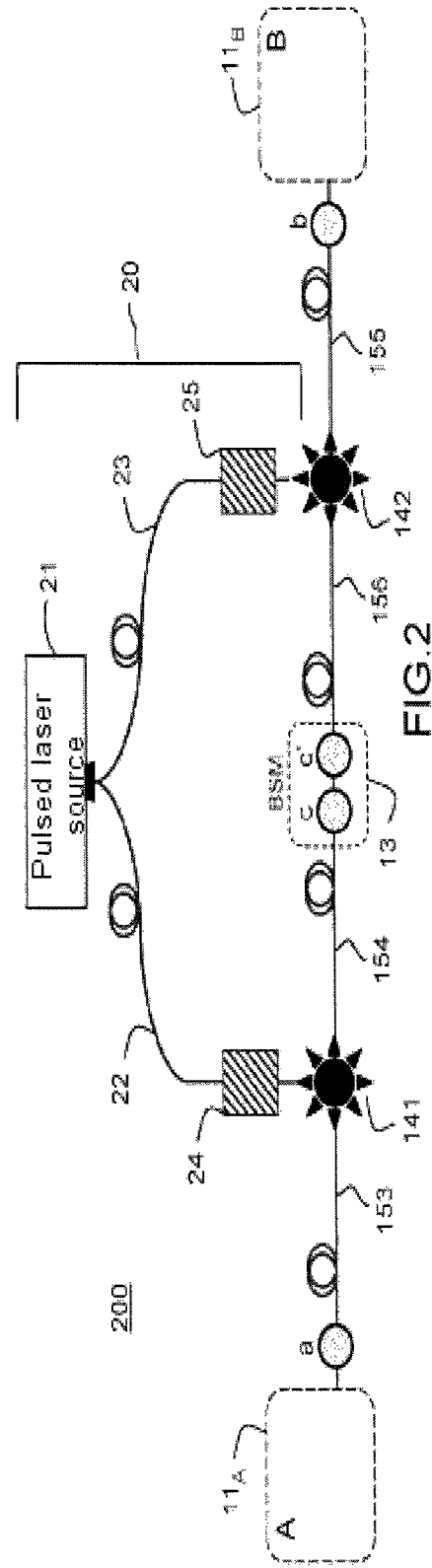
FIG. 2, a diagram illustrating in a general manner a communication network with a device for synchronizing the entanglement sources according to an exemplary embodiment of the invention.

FIG. 2 describes an exemplary embodiment of a quantum communication network 200 according to the invention between two users Alice and Bob situated at the places A and B. The quantum communication network is, like the network 100 represented in FIG. 1C, a network based on quantum relays. It comprises a plurality of optically pumped entanglement sources 141, 142 and of relay stations 13 disposed between the sources and allowing entanglement teleportation between the users. The generation of the pairs of entangled photons in the entanglement sources is for example obtained by pumping a nonlinear optical component, for example by means of a process of 4-wave mixing by $3^{rd}$-order nonlinear effect ($\chi^{(3)}$) in a nonlinear fiber or by spontaneous parametric conversion by $2^{nd}$-order nonlinear effect ($\chi^{(2)}$) in a nonlinear crystal, otherwise called SPDC according to the abbreviation standing for the expression "spontaneous parametric down conversion". In this example, only two entanglement sources are represented, but the invention applies equally well to a communication network comprising n entanglement sources, n≥2, n−1 relay stations then being envisaged, with a relay station between two sources. Between the entanglement sources and the relay station on the one hand and the entanglement sources and the users on the other hand, optical fiber segments 153, 154, 155, 156, allow the propagation of the entangled photons, preferably at a telecom wavelength so as to ensure the propagation of the photons over each segment with the lowest possible losses. For each user, a receiver 11A, 11B allows the analysis of the quantum state of a photon of the pair of entangled photons generated by the closest source. As described previously, the receivers comprise for example a device for analyzing qubits and two detectors for the analysis of the quantum state of the photons according to two measurement bases. The detectors used are for example superconducting detectors for single photon detection or SSPD, according to the abbreviation standing for the expression "superconducting single-photon detectors".

In the example of FIG. 2, the quantum communication network also comprises a device 20 for synchronizing the entanglement sources 141, 142. The synchronization device 20 comprises a pulsed optical source 21, advantageously a laser source, for example a picosecond laser source, allowing the emission of distributed pulses to the set of entanglement sources so as to ensure an optical clock common to said sources. Hereinafter in the application, these pulses are called "clock pulses". The wavelength of the source, the duration of the pulses and the repetition rate are chosen as a function of the length of the network. Advantageously, in order to cover a maximum distance while minimizing the propagation losses, the wavelength will be able to be chosen in the telecoms bands standardized by the ITU (for example, bands O, E, S, C, L, U). One then speaks of "telecom" wavelengths. Optical fiber segments 22, 23, suitable for the propagation at the emission wavelength of the laser source 21, allow propagation of the clock pulses respectively to the entanglement sources 141, 142. Alternatively, propagation of the clock pulses in free space is also possible in the case where said pulsed optical source emits in a spectral band included in one of the transparency bands of the atmosphere (visible spectral band, and spectral bands centered around 4 μm, 4.6 μm and 8.5 to 10 μm). In practice, only a laser source emitting in the visible is conceivable on account of the availability of the sources and detectors of single photons in the transparency spectral bands of the atmosphere. Free-space propagation in the visible raises implementational difficulties related in particular to natural obstacles and to meteorological conditions, but also to stray light which would limit implementation to nocturnal conditions. Although propagation of the clock pulses in free space is theoretically possible for the implementation of the invention, such a realization would then function poorly, so that the propagation by optical fibers of clock pulses at telecom wavelength is preferred.

Advantageously, the synchronization device furthermore comprises, at the level of each entanglement source, a module 24 for shaping the clock pulse making it possible to regenerate and/or adapt the wavelength necessary to pumping the entanglement source. In the course of propagation indeed, for considerable distances, the losses and the chromatic dispersion may bring about respectively a decrease in the mean optical power and a broadening of the duration of the pulse acting as optical clock for the entanglement source. As will be described in greater detail subsequently, the module 24 can then comprise for example a clock regeneration device, making it possible to compensate the effects of chromatic dispersion resulting from the propagation of the pulse from the laser source to the entanglement source. It can also comprise a low-noise high-gain amplifier, for example an erbium-doped fiber amplifier, making it possible to recover the suitable mean optical power, this type of amplifier introducing only very little or negligible timing jitter. The clock pulse shaping module 24 also comprises a frequency conversion device for the optical clock pulse, using for example a nonlinear optics component operating in the frequency doubling regime (or SHG according to the expression "second harmonic generation") or the frequency summation regime (or SFG according to the expression "sum frequency generation"), and allowing the generation of a optical pulse at a suitable wavelength adapted to pump the entanglement source for the generation of pairs of entangled photons. The suitable wavelength is for example in the visible, making it possible to pump a nonlinear optical component of the entanglement source for the generation of entangled photons at telecom wavelength. The set of steps described hereinabove for shaping the clock pulse can be carried out with commercially available components used in the telecoms industry. In particular, the frequency conversion can be carried out by means of nonlinear waveguides (NL/W according to the abbreviation standing for the expression "non linear waveguides") available commercially and particularly suitably adapted at one and the same time for frequency doubling and with a view to use with entanglement sources based on mechanisms of SDPC type, on account of their effectiveness, compactness and possibility of optical fibring. The distribution and then the local shaping of the clock pulses thus described makes it possible to automatically synchronize the set of entanglement sources. The resulting time jitter on the emission of the pairs of entangled photons is due only to the intrinsic timing jitter of the optical pulse source, typically of the order of a few percent of the laser pulse duration.

The synchronization device thus described can be applied to a quantum communication network using any quantum observable for encoding the photons, and in particular the polarization, the frequency, the emission time.

Figure 3:
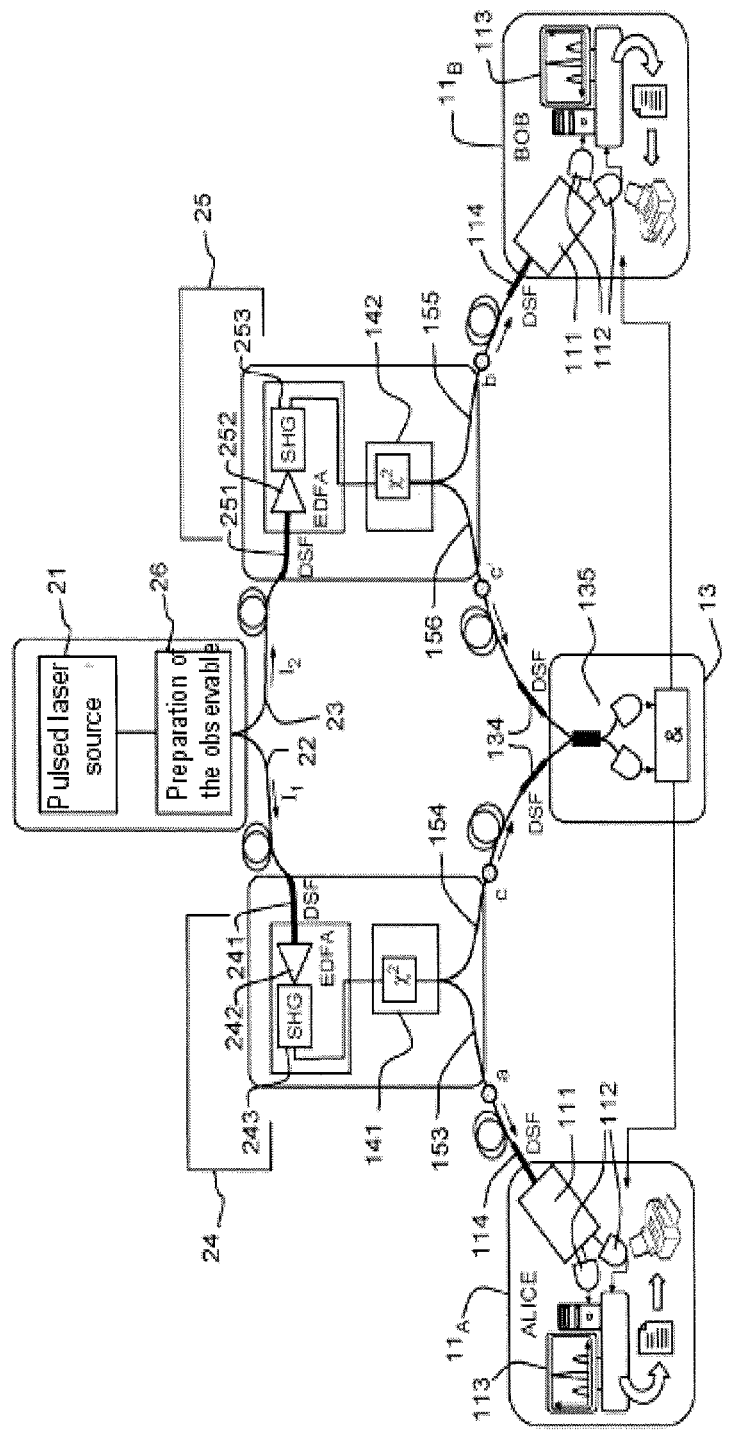
FIG. 3, a diagram showing a particular example of the communication network illustrated in FIG. 2.

FIG. 3 represents according to a more detailed exemplary embodiment elements of the quantum communication network of FIG. 2.

The optical emission source 21 of the clock pulses is for example a picosecond laser operating at 5 GHz in a telecom frequency band, for example at 1550 nm. The clock pulses (denoted $I_1$, $I_2$ in this example) are distributed on either side toward the entanglement sources 141, 142 over a given distance of standard optical fiber (22, 23) that may be as much as a few hundred kilometers, or indeed more by using repeaters, if the technology used for these components does not introduce any additional timing jitter. The parameters of the optical emission source are chosen as a function of the foreseeable effects related to propagation in a fiber over a long distance. For example, the central wavelength is adapted to ensure minimum losses in the fiber, for example in this example, minimum losses in silica. The choice of the pulse duration (for example of the order of 1 ps) and of the mean optical power (typically 0.1 mW) is based on a compromise consisting in avoiding nonlinear effects (for example of self phase modulation type) during the propagation of the clock pulses, while maintaining a sufficiently short pulse duration to allow operations of simple spectral filtering on the photon pairs, the filtering making it possible to adapt the coherence time of the photons (photons at the Fourier limit). Moreover, the repetition rate ought to be as large as possible so as to significantly increase the bitrate of the quantum communication. However, two photons arriving consecutively at a photon counter must be able to be separated; the repetition rate is therefore limited by the technology used for the photon counter. Typically, superconducting detectors for the detection of single photons (SSPD) typically operate today with a timing jitter of 40 ps (see for example M. Halder et al. "Entangling independent photons by time measurement", Nature Phys. 3, 692 (2007)), limiting to 5 GHz the repetition rate of the clock pulses emission source.

The synchronization device can advantageously comprise a module 26 for preparing the quantum observable, adapted in particular for quantum communication networks based on encoding the photons by the emission time ("time-bin"). Encoding by emission time is recognized today as one of the most robust protocols for long-distance quantum communication, on account of the limitation of the decoherence effects that may appear during propagation in optical fibers (see for example H. de Riedmatten et al. "Long-distance entanglement swapping with photons from separated sources", Phys. Rev. A, 71, 050302 (R) (2005)). The module 26 for preparing the quantum state makes it possible to pre-encode the clock pulse itself. Accordingly, the module 26 comprises a temporal demultiplexer device disposed directly at the output of the pulsed laser source 21 and making it possible to generate pairs of coherent pulses, that is to say exhibiting a constant phase relation between the pulses of a pair of pulses. The temporal demultiplexer device is for example a Mach-Zehnder interferometer whose arms are adjusted to obtain the separation of an incident pulse into two temporally shifted pulses. The pulse doublets thus generated are dispatched to the entanglement sources so as to be frequency converted locally and used for pumping the nonlinear optical component allowing the generation of the photons entangled by their emission time.

As illustrated in FIG. 3, the chromatic dispersion in the fibers 22, 23 can be compensated respectively by dispersion compensation modules 241, 251 (for example dispersion shifted fibers of suitable length or DSF according to the abbreviation standing for the expression "dispersion-shifted fiber"). The modules 241, 251 form part respectively of the clock pulse shaping modules 24, 25 described in FIG. 2. The modules 24, 25 furthermore comprise respectively in this example an optical amplifier (242, 252) and a frequency doubling device (243, 253). Advantageously, a polarizer (not represented in FIG. 3) is arranged ahead of the frequency doubler to retain the polarization axis of interest. This polarizer can be envisaged if the clock pulses are depolarized so as to forestall polarization rotation effects engendered by temporal variation of birefringence during propagation in the fiber. Typically, the applicants have shown that the losses in the mean optical power of the clock pulses after propagation of about 100 km are of the order of −30 dBm. The clock pulses can be regenerated by means of an optical amplifier (242, 252) of erbium-doped fiber amplifier type, available commercially, and whose gain is typically 60 dB. The frequency doubling stages 243, 253 are for example waveguides of periodically polarized lithium niobate (or PPLN/W according to the expression "periodically poled lithium niobate waveguide"), the effectiveness of which is recognized.

The entanglement sources 141, 142 comprise for example a nonlinear optical component allowing the conversion of the pump pulses (doubled clock pulses at 775 nm) into non-degenerate pairs of signal and complementary ("idler") photons, respectively at 1549 nm and 1551 nm. The two internal photons (c and c') of the two pairs of entangled photons thus obtained are dispatched to the device 13 for analyzing the Bell state (or BSM), in which a measurement of interference of the photons is carried out by means of a two-photon interference device 135 (see for example P. Aboussouan et al., "High-visibility two-photon interference at a telecom wavelength using picosecond-regime separated sources", Physical Review A 81, 021801 (R) (2010)). Advantageously, dispersion compensation modules 134, 135 can be envisaged at the input of the BSM. The external photons (a and b) of the pairs of entangled photons are dispatched respectively to the receivers A and B of the users Alice and Bob. Each receiver comprises for example, as described previously, a qubits analysis device 111 and two receivers 112, associated with a computer 113.

Figure 4:
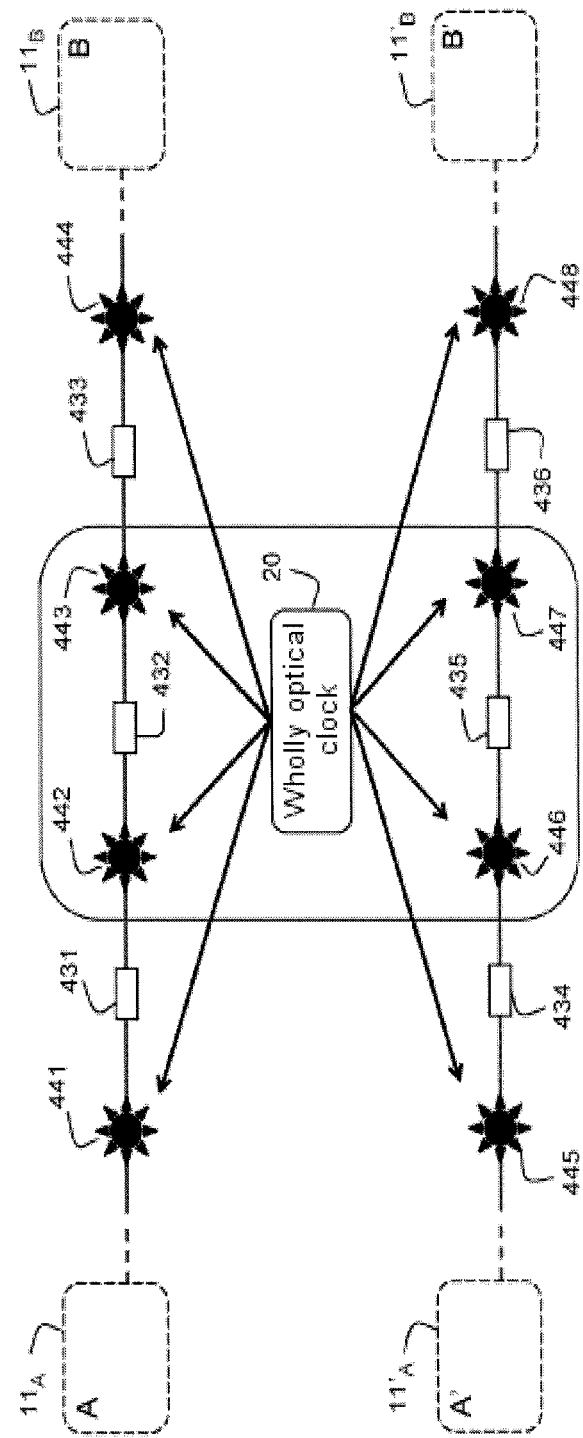
FIG. 4, a diagram illustrating a variant of a quantum communication network according to the invention.

The applicants have thus demonstrated the feasibility of a long-distance quantum communication network, based on relay operations between independent sources of entangled photons and the users, by virtue of an original method and device for synchronizing the entanglement sources. The wholly optical approach of the synchronization method thus disclosed allows the synchronization of distant entanglement sources at a high rate and without additional timing jitter. The applicants have shown the feasibility, with commercially available telecom and nonlinear optics components, of a quantum communication between two users more than 400 km apart. The concept can be extended to an unlimited number of entanglement sources and users, in a pairwise communication. FIG. 4 thus shows an exemplary quantum communication network between on the one hand A and B and on the other hand A' and B'. Between A and B and A' and B' respectively, are situated sufficient entanglement sources (141 to 144 and 145 to 148) relayed by relay stations of BSM type (131 to 133 and 134 to 136) to ensure the pairwise quantum communication over the distance sought. A synchronization device 20 such as described previously makes it possible to ensure synchronization of the set of entanglement sources 141 to 148 without introducing additional timing jitter, thus allowing high-bitrate communication.

Although described through a certain number of detailed exemplary embodiments, the synchronization procedure and device according to the invention comprise different variants, modifications and enhancements which will be obviously apparent to the person skilled in the art, it being understood that these different variants, modifications and enhancements form part of the scope of the invention, such as defined by the claims which follow.

The invention claimed is:

1. A device for synchronizing entanglement sources with optical pump in a quantum communication network, comprising:
    a pulsed optical source allowing the emission of telecom wavelength optical pulses distributed in parallel to the entanglement sources to ensure an optical clock common to said entanglement sources; and
    for each entanglement source, a frequency conversion device for the distributed optical pulse, allowing generation of an optical pulse at a wavelength adapted to optically pump the entanglement source for generation of pairs of entangled photons.

2. The synchronization device as claimed in claim 1, wherein said pulsed optical source is a laser emitting pulses at 1550 nm.

3. The synchronization device as claimed in claim 1, further comprising sections of optical fiber adapted to the propagation of said pulses at said telecom wavelength.

4. The synchronization device as claimed in claim 1, further comprising, for each entanglement source, a clock regeneration device.

5. The synchronization device as claimed in claim 1, wherein the frequency conversion device is a frequency doubler.

6. The synchronization device as claimed in claim 1, wherein said pulsed optical source is a laser emitting picosecond pulses.

7. A quantum communication network between at least one first and one second user pair comprising:
    for each user pair, a plurality of entanglement sources disposed in cascade between said users and between two entanglement sources;
    a relay station; and
    a device for synchronizing the said entanglement sources as claimed in claim 1.

8. The quantum communication network as claimed in claim 7, wherein the entanglement sources comprise a nonlinear optics device for the generation of pairs of entangled photons.

9. The quantum communication network as claimed in claim 7, wherein
    the quantum communication network is based on the use of an "emission time" quantum observable for encoding the photons; and wherein
    the synchronization device further comprises a device for preparing the "emission time" quantum observable comprising a Mach-Zehnder interferometer allowing distribution of pulse doublets.

10. The quantum communication network as claimed in claim 8, wherein the quantum observable for encoding the photons emitted by said entanglement sources is emission time.

11. A method for synchronizing entanglement sources with optical pump in a quantum communication network, comprising: emitting and distributing in parallel, to the entanglement sources, telecom wavelength optical clock pulses; by using a pulsed optical source and locally, at each of the entanglement sources, frequency converting the telecom wavelength optical clock pulses to a wavelength adapted to optically pump the entanglement sources.

12. The synchronization method as claimed in claim 11, further comprising at the level of each of the entanglement sources, the regeneration of the clock pulse.

* * * * *